USO10401248B2

United States Patent
Tokuda et al.

(10) Patent No.: US 10,401,248 B2
(45) Date of Patent: Sep. 3, 2019

(54) PRESSURE SENSOR CHIP

(71) Applicant: Azbil Corporation, Chiyoda-ku (JP)

(72) Inventors: Tomohisa Tokuda, Chiyoda-ku (JP); Yoshiyuki Ishikura, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 151 days.

(21) Appl. No.: 15/300,533

(22) PCT Filed: Mar. 9, 2015

(86) PCT No.: PCT/JP2015/056783
§ 371 (c)(1),
(2) Date: Sep. 29, 2016

(87) PCT Pub. No.: WO2015/151728
PCT Pub. Date: Oct. 8, 2015

(65) Prior Publication Data
US 2017/0176279 A1 Jun. 22, 2017

(30) Foreign Application Priority Data
Mar. 31, 2014 (JP) .................. 2014-071064

(51) Int. Cl.
*G10L 13/02* (2013.01)
*G01L 19/14* (2006.01)
(Continued)

(52) U.S. Cl.
CPC .......... *G01L 19/147* (2013.01); *G01L 9/0042* (2013.01); *G01L 9/0054* (2013.01);
(Continued)

(58) Field of Classification Search
CPC ................ G01L 19/147; G01L 13/02
See application file for complete search history.

(56) References Cited

U.S. PATENT DOCUMENTS

| 5,062,302 A | 11/1991 | Petersen et al. |
| 2006/0272422 A1* | 12/2006 | Yoneda ............ G01L 19/0618 73/724 |

(Continued)

FOREIGN PATENT DOCUMENTS

| EP | 1394522 A2 * | 3/2004 | ......... G10L 19/0645 |
| JP | 57-40626 A | 3/1982 | |

(Continued)

OTHER PUBLICATIONS

International Search Report dated Apr. 14, 2015 in PCT/JP15/056783 Filed Mar. 9, 2015.

*Primary Examiner* — Jamel E Williams
(74) *Attorney, Agent, or Firm* — Oblon, McClelland, Maier & Neustadt, L.L.P.

(57) ABSTRACT

A pressure sensor chip according to the present invention includes a non-bonding region that is provided in a stopper member and connected to a periphery of a pressure introduction hole. A plurality of protrusions are discretely formed on at least one of a first surface and a second surface that face each other in the non-bonding region. Passages between the protrusions serve as channels between the periphery of the pressure introduction hole and a peripheral edge of the non-bonding region. Accordingly, stress concentration does not occur at a diaphragm edge and the expected withstand pressure can be obtained.

10 Claims, 8 Drawing Sheets

(51) Int. Cl.
    *G01L 13/02*         (2006.01)
    *G01L 9/00*          (2006.01)
    *G01L 19/06*        (2006.01)

(52) U.S. Cl.
    CPC ............ *G01L 9/0073* (2013.01); *G01L 13/02* (2013.01); *G01L 19/0618* (2013.01); *G01L 19/148* (2013.01)

(56) References Cited

U.S. PATENT DOCUMENTS

| | | | | |
|---|---|---|---|---|
| 2010/0281991 | A1* | 11/2010 | Seeberg | G01L 13/028 73/716 |
| 2012/0006129 | A1* | 1/2012 | Tokuda | G01L 19/147 73/862.629 |
| 2013/0239694 | A1* | 9/2013 | Seto | G01L 13/025 73/720 |
| 2014/0137652 | A1* | 5/2014 | Tokuda | G01L 13/025 73/715 |
| 2014/0144243 | A1* | 5/2014 | Tanaka | G01L 13/025 73/716 |
| 2014/0157905 | A1* | 6/2014 | Tokuda | G01L 9/0051 73/715 |
| 2015/0330854 | A1* | 11/2015 | Tsushima | G01L 13/026 73/717 |

FOREIGN PATENT DOCUMENTS

| | | | |
|---|---|---|---|
| JP | 1-105840 | U | 7/1989 |
| JP | 2-203233 | A | 8/1990 |
| JP | 3-44646 | U | 4/1991 |
| JP | 2013130453 | A * | 7/2013 |
| JP | 2013-190343 | A | 9/2013 |

* cited by examiner

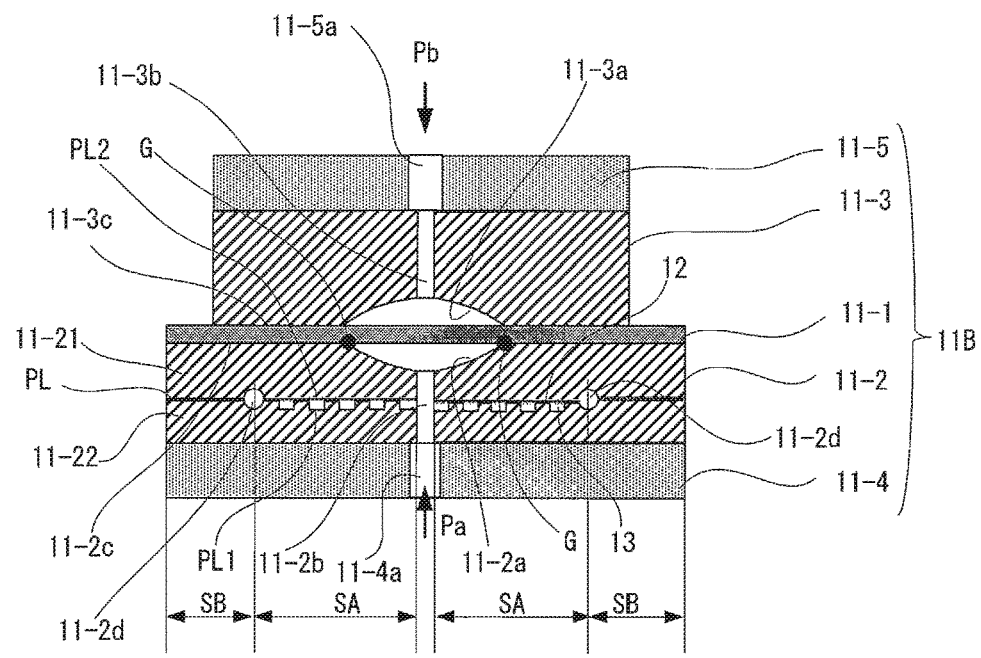
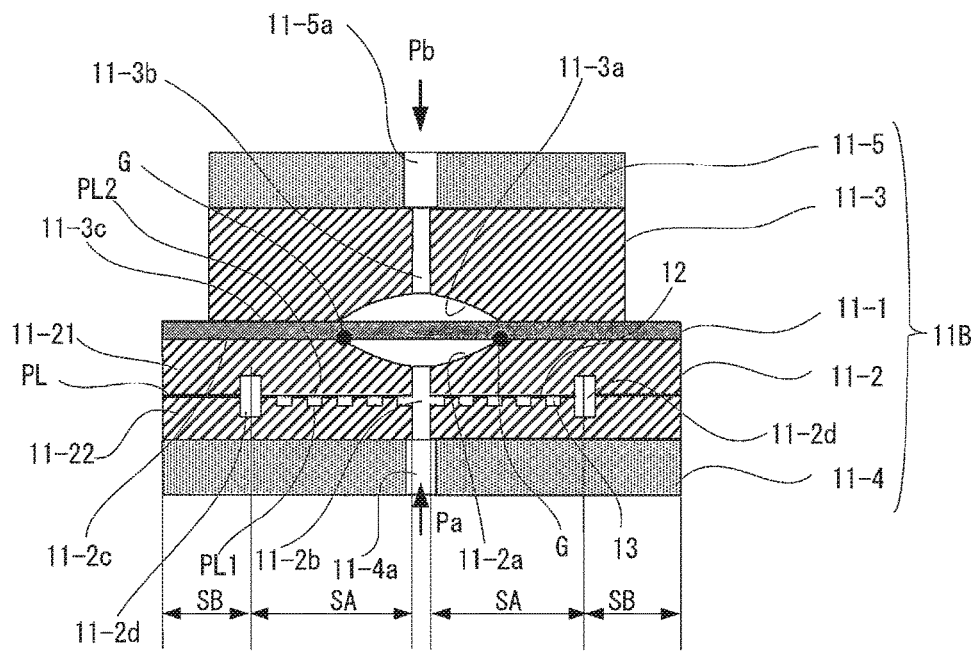

PRESSURE SENSOR CHIP

TECHNICAL FIELD

The present invention relates to pressure sensor chips including a sensor diaphragm that outputs a signal corresponding to the difference between pressures applied to one and the other surfaces of the sensor diaphragm. An example of such a pressure sensor chip includes a thin plate-shaped diaphragm, which is displaced when a pressure is applied thereto, and a strain resistance gauge formed on the diaphragm. The pressure sensor chip detects the pressure applied to the diaphragm on the basis of a change in the resistance of the strain resistance gauge formed on the diaphragm.

BACKGROUND ART

Differential pressure sensors including built-in pressure sensor chips, which include a sensor diaphragm that outputs a signal corresponding to the difference between pressures applied to one and the other surfaces of the sensor diaphragm, have been used as industrial differential pressure sensors.

Such a differential pressure sensor is structured so that measurement pressures applied to high-pressure-side and low-pressure-side pressure-receiving diaphragms are transmitted to one and the other surfaces of the sensor diaphragm by enclosed liquid that serves as a pressure transmitting medium. Strain of the sensor diaphragm is detected as, for example, a change in resistance of a strain resistance gauge, and the resistance change is converted into an electrical signal to be output.

The differential pressure sensor is used to, for example, measure a liquid surface height in a sealed tank containing measurement fluid in, for example, a high-temperature reaction column of a petroleum refining plant by detecting a pressure difference between two locations, which are upper and lower locations, in the sealed tank.

FIG. 12 is a schematic diagram illustrating the structure of a differential pressure sensor according to the related art. This differential pressure sensor 100 includes a pressure sensor chip 1, which includes a sensor diaphragm (now shown) and which is installed in a meter body 2. The sensor diaphragm included in the pressure sensor chip 1 is made of, for example, silicon or glass. A strain resistance gauge is formed on a surface of the diaphragm, which is thin plate shaped. The meter body 2 includes a main section 3, which is made of a metal, and a sensor section 4. Barrier diaphragms (pressure-receiving diaphragms) 5a and 5b, which serve as a pair of pressure-receiving portions, are provided on side surfaces of the main section 3. The pressure sensor chip 1 is installed in the sensor section 4.

In the meter body 2, the pressure sensor chip 1, which is installed in the sensor section 4, is connected to the barrier diaphragms 5a and 5b provided on the main section 3 through pressure damping chambers 7a and 7b that are partitioned from each other by a large-diameter center diaphragm 6. Pressure transmitting media 9a and 9b, such as silicone oil, are enclosed in channels 8a and 8b that connect the pressure sensor chip 1 to the barrier diaphragms 5a and 5b.

The pressure media, such as silicone oil, are necessary to prevent adhesion of foreign matter contained in the measurement medium to the sensor diaphragm and to prevent corrosion of the sensor diaphragm by separating the pressure-receiving diaphragms, which are resistant to corrosion, from the sensor diaphragm, which is sensitive to stress (pressure).

As illustrated in FIG. 13A, which is a schematic diagram illustrating an operation mode of the differential pressure sensor 100 in a steady state, a first process fluid pressure (first measurement pressure) Pa is applied to the barrier diaphragm 5a, and a second process fluid pressure (second measurement pressure) Pb is applied to the barrier diaphragm 5b. Accordingly, the barrier diaphragms 5a and 5b are displaced and the applied pressures Pa and Pb are transmitted to one and the other surfaces of the sensor diaphragm included in the pressure sensor chip 1 through the pressure damping chambers 7a and 7b, which are partitioned from each other by the center diaphragm 6, by the pressure transmitting media 9a and 9b. As a result, the sensor diaphragm of the pressure sensor chip 1 is displaced by an amount corresponding to the difference ΔP between the pressures Pa and Pb.

If, for example, an excessive pressure Pover is applied to the barrier diaphragm 5a, the barrier diaphragm 5a is displaced by a large amount as illustrated in FIG. 13B, and accordingly the center diaphragm 6 is displaced so as to absorb the excessive pressure Pover. If the barrier diaphragm 5a comes into contact with the bottom surface of a recess 10a in the meter body 2 (excessive-pressure protection surface) so that further displacement of the barrier diaphragm 5a does not occur, transmission of the pressure difference ΔP to the sensor diaphragm through the barrier diaphragm 5a stops. If the excessive pressure Pover is applied to the barrier diaphragm 5b, similar to the case in which the excessive pressure Pover is applied to the barrier diaphragm 5a, the barrier diaphragm 5b comes into contact with the bottom surface of a recess 10b in the meter body 2 (excessive-pressure protection surface) so that further displacement of the barrier diaphragm 5b does not occur. Accordingly, transmission of the pressure difference ΔP to the sensor diaphragm through the barrier diaphragm 5b stops. As a result, breakage of the pressure sensor chip 1, that is, breakage of the sensor diaphragm included in the pressure sensor chip 1, due to the application of the excessive pressure Pover can be prevented.

Since the differential pressure sensor 100 is configured so that the pressure sensor chip 1 is disposed in the meter body 2, the pressure sensor chip 1 can be protected from an external corrosive environment including, for example, process fluid. However, the differential pressure sensor 100 is necessarily large in size because the recesses 10a and 10b, which limit the displacements of the center diaphragm 6 and the barrier diaphragms 5a and 5b, are provided to protect the pressure sensor chip 1 from the excessive pressure Pover.

Accordingly, a structure in which a pressure sensor chip is provided with a first stopper member and a second stopper member has been proposed. The first stopper member and the second stopper member include recesses arranged so as to face one and the other surfaces of a sensor diaphragm, so that the sensor diaphragm is prevented from being excessively displaced when an excessive pressure is applied thereto. Accordingly, the sensor diaphragm is prevented from being damaged or broken (see, for example, PTL 1).

FIG. 14 is a schematic diagram illustrating a pressure sensor chip having the structure described in PTL 1. FIG. 14 shows a sensor diaphragm 51-1, first and second stopper members 51-2 and 51-3 that are bonded together with the sensor diaphragm 51-1 interposed therebetween, and first and second bases 51-4 and 51-5 bonded to the stopper members 51-2 and 51-3. The stopper members 51-2 and 51-3 and the bases 51-4 and 51-5 are made of silicon or glass.

The stopper members 51-2 and 51-3 of the pressure sensor chip 51 respectively have recesses 51-2*a* and 51-3*a* formed therein. The recess 51-2*a* in the stopper member 51-2 faces one surface of the sensor diaphragm 51-1, and the recess 51-3*a* in the stopper member 51-3 faces the other surface of the sensor diaphragm 51-1. The recesses 51-2*a* and 51-3*a* have curved surfaces (non-spherical surfaces) that follow the sensor diaphragm 51-1 in the displaced state, and pressure introducing holes (pressure introduction holes) 51-2*b* and 51-3*b* are formed at the bottom portions of the recesses 51-2*a* and 51-3*a*, respectively. Pressure introducing holes (pressure introduction holes) 51-4*a* and 51-5*a* are formed in the bases 51-4 and 51-5, respectively, at positions corresponding to the positions of the pressure introduction holes 51-2*b* and 51-3*b* in the stopper members 51-2 and 51-3.

When the pressure sensor chip 51 is used, if an excessive pressure is applied to the one surface of the sensor diaphragm 51-1 and the sensor diaphragm 51-1 is displaced, the entirety of the displaced surface is received by the curved surface of the recess 51-3*a* in the stopper member 51-3. Similarly, if an excessive pressure is applied to the other surface of the sensor diaphragm 51-1 and the sensor diaphragm 51-1 is displaced, the entirety of the displaced surface is received by the curved surface of the recess 51-2*a* in the stopper member 51-2.

Thus, the sensor diaphragm 51-1 is prevented from being excessively displaced when an excessive pressure is applied to the sensor diaphragm 51-1, and stress concentration does not occur at a peripheral portion of the sensor diaphragm 51-1. Accordingly, the risk of breakage of the sensor diaphragm 51-1 due to the application of excessive pressure can be effectively reduced, and the excessive-pressure protection operation pressure (withstand pressure) can be increased. Furthermore, in the structure illustrated in FIG. 12, the size of the meter body 2 can be reduced by omitting the center diaphragm 6 and the pressure damping chambers 7*a* and 7*b* and directly transmitting the measurement pressures Pa and Pb from the barrier diaphragms 5*a* and 5*b* to the sensor diaphragm 51-1.

CITATION LIST

Patent Literature

PTL 1: Japanese Unexamined Patent Application Publication No. 2005-69736

SUMMARY OF INVENTION

Technical Problem

However, in the structure of the pressure sensor chip 51 illustrated in FIG. 14, peripheral portions 51-2-*c* and 51-3*c* of the stopper members 51-2 and 51-3, respectively, are bonded to the one and the other surfaces of the sensor diaphragm 51-1 over the entire region thereof. More specifically, the peripheral portion 51-2*c*, which surrounds the recess 51-2*a* in the stopper member 51-2, is arranged so as to face the one surface of the sensor diaphragm 51-1 and is directly bonded to the one surface of the sensor diaphragm 51-1 over the entire region thereof. Similarly, the peripheral portion 51-3*c*, which surrounds the recess 51-3*a* in the stopper member 51-3, is arranged so as to face the other surface of the sensor diaphragm 51-1 and is directly bonded to the other surface of the sensor diaphragm 51-1 over the entire region thereof.

In such a structure, if an excessive pressure that exceeds the excessive-pressure protection operation pressure (withstand pressure) of the stopper member 51-2 is applied, the sensor diaphragm 51-1 is bent and comes into contact with the bottom of the recess 51-2*a* in the stopper member 51-2, and then the sensor diaphragm 51-1 is further bent together with the stopper member 51-2 in this state. In such a case, since both surfaces of the sensor diaphragm 51-1 are restrained in the region around the edge of the sensor diaphragm 51-1 (portions enclosed by the one-dot chain lines in FIG. 14) at a side at which the pressure is applied and at which the largest tensile stress occurs, stress concentration occurs in this region and the desired withstand pressure cannot be obtained.

Furthermore, when the recesses 51-2*a* and 51-3*a* in the stopper members 51-2 and 51-3 have different opening sizes due to manufacturing errors, the position at which the sensor diaphragm 51-1 is restrained is displaced. Such a displacement may cause greater stress concentration. In this case, stress concentration also occurs due to abnormal contact between the sensor diaphragm 51-1 and the bottom of the recesses 51-2*a* and 51-3*a*, and there is a risk that the withstand pressure will be further reduced.

An object of the present invention is to provide a pressure sensor chip in which the stress generated because the sensor diaphragm is restrained is reduced and in which stress concentration does not occur at the edge of the diaphragm so that the desired withstand pressure can be obtained.

Solution to Problem

A pressure sensor chip according to the present invention includes a sensor diaphragm that outputs a signal corresponding to a difference between pressures applied to one surface and the other surface of the sensor diaphragm; and a first holding member and a second holding member that are respectively bonded to the one surface and the other surface of the sensor diaphragm in such a manner that peripheral portions of the first and second holding members face the one surface and the other surface of the sensor diaphragm, each of the first and second holding members including a pressure introduction hole that transmits a measurement pressure to the sensor diaphragm. The first holding member includes a non-bonding region formed inside the first holding member, the non-bonding region being parallel to pressure-receiving surfaces of the sensor diaphragm and being connected to a periphery of the pressure introduction hole, and a plurality of protrusions that are discretely formed on at least one of a first surface and a second surface that face each other in the non-bonding region in the first holding member. Passages between the plurality of protrusions formed in the first holding member form channels between the periphery of the pressure introduction hole and a peripheral edge of the non-bonding region. The second holding member includes a recess formed in a surface of the second holding member at a side at which the second holding member is bonded to the other surface of the sensor diaphragm.

Advantageous Effects of Invention

According to the present invention, the non-bonding region, which is connected to the periphery of the pressure introduction hole, is provided in the first holding member, and the non-bonding region in the first holding member is provided as a region in which a first surface and a second surface are separated from each other and face each other along a portion of a plane that is parallel to the pressure-receiving surfaces of the sensor diaphragm. Therefore, the non-bonding region in the first holding member provides a pressure-receiving surface that reduces a force applied to the first holding member in the opposite direction, so that no opening is formed at the diaphragm edge. Accordingly, the stress generated because the sensor diaphragm is restrained is reduced, and stress concentration does not occur at the diaphragm edge. Accordingly, the expected withstand pressure can be obtained.

In addition, according to the present invention, the protrusions are discretely formed on at least one of the first surface and the second surfaces that face each other in the non-bonding region provided in the first holding member, and the passages between the protrusions serve as channels between the periphery of the pressure introduction hole and the peripheral edge of the non-bonding region. Therefore, a commonly used pressure transmitting medium, such as oil, can be easily enclosed. Furthermore, by reducing the transmission resistance of the pressure transmitting medium to be enclosed, the influence of malfunction due to a difference in transmission speed can be eliminated. With regard to an application of pressure from the opposite side, sufficient withstand pressure can be ensured by optimally designing the area of the protrusions.

BRIEF DESCRIPTION OF DRAWINGS

FIG. 7 is a schematic diagram illustrating a pressure sensor chip according to a second embodiment of the present invention (Embodiment 2).

FIG. 8 is a diagram illustrating an example in which an annular groove formed in a stopper member included in the pressure sensor chip according to Embodiment 2 is slit-shaped (has a rectangular cross section).

DESCRIPTION OF EMBODIMENTS

Figure 1:
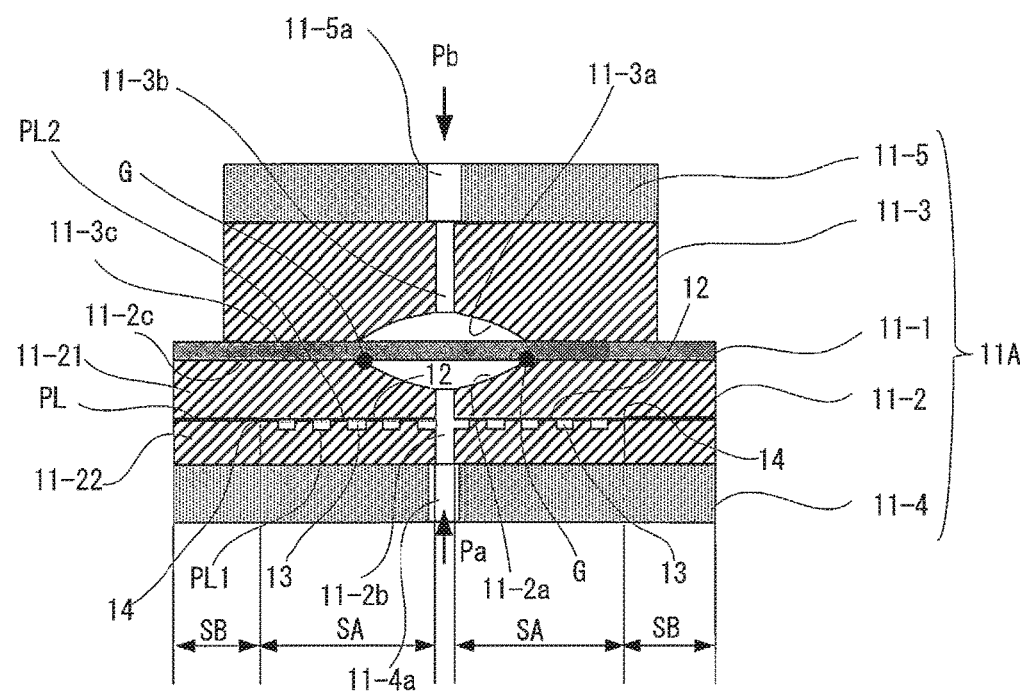
FIG. 1 is a schematic diagram illustrating a pressure sensor chip according to a first embodiment of the present invention (Embodiment 1).

A pressure sensor chip according to the present invention will now be described.

A pressure sensor chip according to the present invention includes a sensor diaphragm that outputs a signal corresponding to a difference between pressures applied to one surface and the other surface of the sensor diaphragm; and a first holding member and a second holding member that are respectively bonded to the one surface and the other surface of the sensor diaphragm in such a manner that peripheral portions of the first and second holding members face the one surface and the other surface of the sensor diaphragm, each of the first and second holding members including a pressure introduction hole that transmits a measurement pressure to the sensor diaphragm. The first holding member includes a non-bonding region formed inside the first holding member, the non-bonding region being parallel to pressure-receiving surfaces of the sensor diaphragm and being connected to a periphery of the pressure introduction hole, and a plurality of protrusions that are discretely formed on at least one of a first surface and a second surface that face each other in the non-bonding region in the first holding member. Passages between the plurality of protrusions formed in the first holding member form channels between the periphery of the pressure introduction hole and a peripheral edge of the non-bonding region. The second holding member includes a recess formed in a surface of the second holding member at a side at which the second holding member is bonded to the other surface of the sensor diaphragm.

In the pressure sensor chip according to the present invention, when a high measurement pressure is applied to the one surface of the sensor diaphragm, the sensor diaphragm is bent toward the second holding member and tries to form an opening at the diaphragm edge. In this case, in the present invention, since the measurement pressure is transmitted to the non-bonding region provided in the first holding member through the pressure introduction hole, the non-bonding region provides a pressure-receiving surface that receives the measurement pressure and causes the first holding member to be bent so as to follow the deformation of the second holding member and the diaphragm in the same direction, so that no opening is formed at the diaphragm edge. Accordingly, the stress generated because the sensor diaphragm is restrained is reduced, and stress concentration does not occur at the diaphragm.

In addition, in the pressure sensor chip according to the present invention, the protrusions are discretely formed on at least one of the first surface and the second surfaces that face each other in the non-bonding region provided in the first holding member, and the passages between the protrusions serve as channels between the periphery of the pressure introduction hole and the peripheral edge of the non-bonding region. Therefore, a commonly used pressure transmitting medium, such as oil, can be easily enclosed. Furthermore, by reducing the transmission resistance of the pressure transmitting medium, the influence of malfunction due to a difference in transmission speed can be eliminated. With regard to an application of pressure from the opposite side, sufficient withstand pressure can be ensured by optimally designing the area of the protrusions.

In the above-described pressure sensor chip according to the present invention, the first holding member may further include an annular groove formed in the first holding member at a peripheral portion of the non-bonding region so as to be recessed in a thickness direction of the first holding member. In such a case, the stress is distributed in the annular groove that extends continuously in the non-bonding region. Therefore, the withstand pressure can be further increased.

In the above-described pressure sensor chip according to the present invention, in the case where the high-pressure-side measurement pressure is always received by the same surface of the sensor diaphragm, the one surface of the sensor diaphragm is set as the pressure-receiving surface that receives the high-pressure-side measurement pressure, and the other surface of the sensor diaphragm is set as a pressure-receiving surface that receives a low-pressure-side measurement pressure. More specifically, in the case where the high-pressure-side measurement pressure is always received by the same surface of the sensor diaphragm, the one surface of the sensor diaphragm is set as the pressure-receiving surface that receives the high-pressure-side measurement pressure, so that the high-pressure-side measurement pressure is transmitted to the non-bonding region in the first holding member through the pressure introduction hole.

In addition, in the above-described pressure sensor chip according to the present invention, the first holding member may also have a recess that prevents excessive displacement of the sensor diaphragm when an excessive pressure is applied to the sensor diaphragm, and the second holding member may also have a non-bonding region similar to that in the first holding member. In this case, similar to the non-bonding region in the first holding portion, a plurality of protrusions may be discretely formed on at least one of a first surface and a second surface that face each other in the non-bonding region in the second holding member, and passages between the protrusions may form channels between the periphery of the pressure introduction hole and the peripheral edge of the non-bonding region in the second holding member.

In this case, irrespective of which of the surfaces of the sensor diaphragm serve as the pressure-receiving surface that receives the high-pressure-side measurement pressure, no opening is formed at the diaphragm edge. Accordingly, the stress generated because the sensor diaphragm is restrained is reduced, and stress concentration does not occur at the diaphragm edge. In addition, a commonly used pressure transmitting medium, such as oil, can be easily enclosed for each of the surfaces of the sensor diaphragm. Furthermore, by reducing the transmission resistance of the pressure transmitting medium to be enclosed, the influence of malfunction due to a difference in transmission speed can be eliminated. With regard to an application of pressure from the opposite side, sufficient withstand pressure can be ensured by optimally designing the area of the protrusions.

Pressure sensor chips according to embodiments of the present invention will now be described in detail with reference to the drawings.

[Embodiment 1]

FIG. 1 is a schematic diagram illustrating a pressure sensor chip according to a first embodiment of the present invention (Embodiment 1).

A pressure sensor chip 11A illustrated in FIG. 1 includes a sensor diaphragm 11-1; first and second stopper members 11-2 and 11-3, which are bonded together with the sensor diaphragm 11-1 interposed therebetween and which serve as holding members; and first and second bases 11-4 and 11-5, which are respectively bonded to the stopper members 11-2 and 11-3. The stopper members 11-2 and 11-3 and the bases 11-4 and 11-5 are made of, for example, silicon or glass.

The stopper members 11-2 and 11-3 of the pressure sensor chip 11A respectively have recesses 11-2a and 11-3a formed therein. The recess 11-2a in the stopper member 11-2 faces one surface of the sensor diaphragm 11-1, and the recess 11-3a in the stopper member 11-3 faces the other surface of the sensor diaphragm 11-1. The recesses 11-2a and 11-3a have curved surfaces (non-spherical surfaces) that follow the sensor diaphragm 11-1 in the displaced state, and pressure introducing holes (pressure introduction holes) 11-2b and 11-3b are formed at the bottom portions of the recesses 11-2a and 11-3a, respectively. In addition, pressure introducing holes (pressure introduction holes) 11-4a and 11-5a are formed in the bases 11-4 and 11-5, respectively, at positions corresponding to the positions of the pressure introduction holes 11-2b and 11-3b in the stopper members 11-2 and 11-3.

In the pressure sensor chip 11A, the stopper member 11-2 has a non-bonding region SA provided therein. The non-bonding region SA is connected to the periphery of the pressure introduction hole 11-2b. The non-bonding region SA is provided as a region in which a first surface PL1 and a second surface PL2 are separated from each other and face each other along a portion of a plane PL that is parallel to pressure-receiving surfaces of the sensor diaphragm 11-1.

Figure 2:
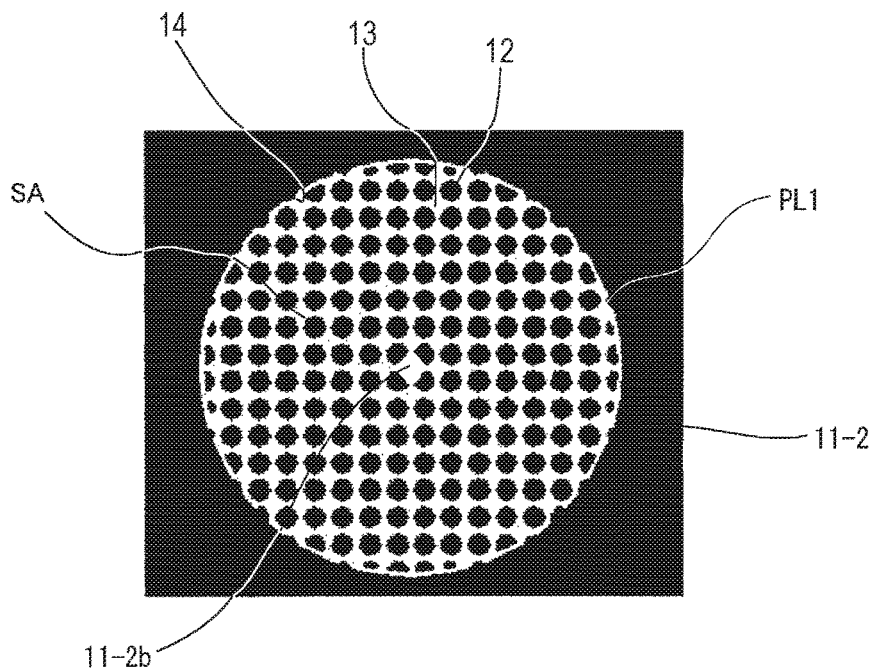
FIG. 2 is a plan view illustrating the shape of a plurality of protrusions that are discretely formed on a first surface in a non-bonding region provided in a stopper member included in the pressure sensor chip according to Embodiment 1.
Figure 3:
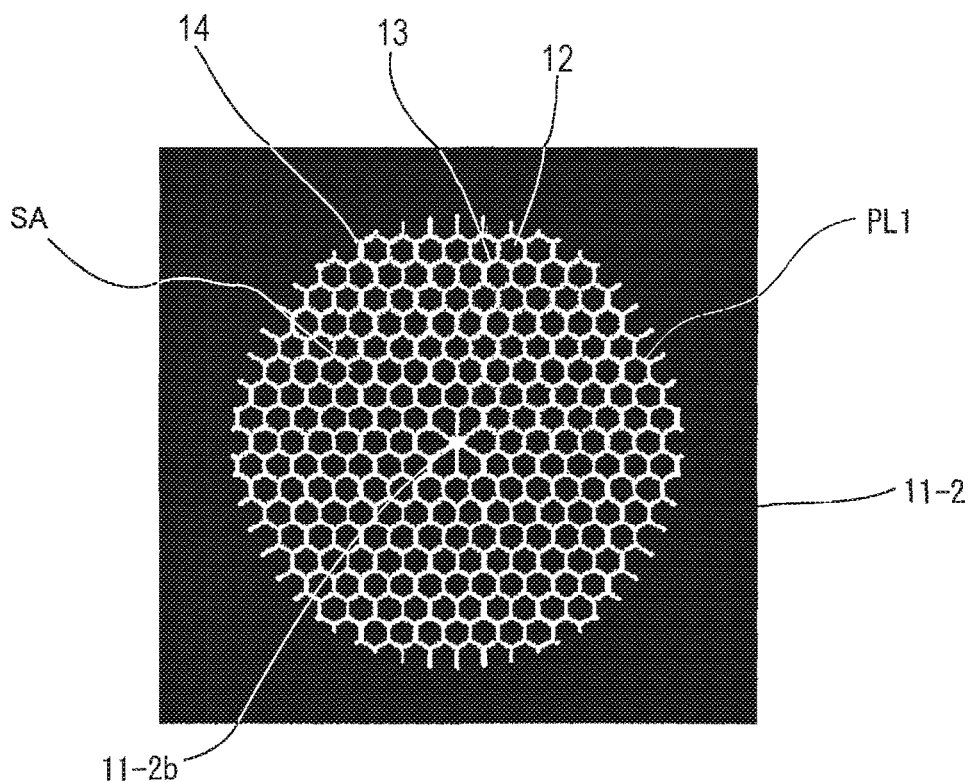
FIG. 3 is a plan view illustrating another example of the shape of a plurality of protrusions that are discretely formed on the first surface in the non-bonding region provided in the stopper member included in the pressure sensor chip according to Embodiment 1.

As illustrated in FIG. 2, a plurality of protrusions (columns) 12 are discretely formed on at least one of the first and second surfaces PL1 and PL2 that face each other in the non-bonding region SA (first surface PL1 in this example). Passages (grooves) 13 between the protrusions 12 serve as channels between the periphery of the pressure introduction hole 11-2b and a peripheral edge 14 of the non-bonding region SA. Although the protrusions 12 have the shape of a circular column in this example, the protrusions 12 may instead have the shape of, for example, a hexagonal column as illustrated in FIG. 3.

In this example, the stopper member 11-2 is divided into two portions along the plane PL, which is parallel to the pressure-receiving surfaces of the sensor diaphragm 11-1. More specifically, the stopper member 11-2 is formed by bonding the two portions, which are a stopper member 11-21 and a stopper member 11-22, in a region SB excluding the non-bonding region SA along the plane PL including the non-bonding region SA. Thus, the plane PL, which is parallel to the pressure-receiving surfaces of the sensor diaphragm 11-1, is divided into the non-bonding region SA, which is connected to the periphery of the pressure introduction hole 11-2*b*, and the bonding region SB, which is not connected to the periphery of the pressure introduction hole 11-2*b*.

Assume that, in the pressure sensor chip 11A, a measurement pressure Pa is the high-pressure-side measurement pressure and a measurement pressure Pb is the low-pressure-side measurement pressure. In this case, when the high-pressure-side measurement pressure Pa is applied to one surface of the sensor diaphragm 11-1, the sensor diaphragm 11-1 is bent toward the stopper member 11-3. At this time, the stopper member 11-2 receives a force in a direction opposite to the direction in which the sensor diaphragm 11-1 is bent, and tries to form an opening at a diaphragm edge (indicated by points G in FIG. 1). In the following description, the direction in which the sensor diaphragm 11-1 is bent in FIG. 1 is referred to as the upward direction, and the direction opposite to the direction in which the sensor diaphragm 11-1 is bent is referred to as the downward direction.

In this case, in the present embodiment, since the measurement pressure Pa is transmitted to the non-bonding region SA provided in the stopper member 11-2 through the pressure introduction hole 11-2*b*, the non-bonding region SA provides a pressure-receiving surface that receives the measurement pressure Pa and reduces the downward force applied to the stopper member 11-2, so that no opening is formed at the diaphragm edge. Accordingly, the stress generated because the sensor diaphragm 11-1 is restrained is reduced, and stress concentration does not occur at the diaphragm edge.

In addition, since the protrusions 12 are discretely formed on the first surface PL1 in the non-bonding region SA provided in the stopper member 11-2, and since the passages 13 between the protrusions 12 serve as channels between the periphery of the pressure introduction hole 11-2*b* and the peripheral edge 14 of the non-bonding region SA, a commonly used pressure transmitting medium, such as oil, can be easily enclosed. Furthermore, by reducing the transmission resistance of the pressure transmitting medium, the influence of malfunction due to a difference in transmission speed can be eliminated. With regard to an application of pressure from the opposite side, sufficient withstand pressure can be ensured by optimizing the area of the protrusions 12.

In the pressure sensor chip 11A, the non-bonding region SA exerts a greater effect when the excessive pressure increases after the sensor diaphragm 11-1 has come into contact with the bottom of the recess 11-3*a* in the stopper member 11-3. This will be described in detail with reference to FIG. 4.

Figure 4:
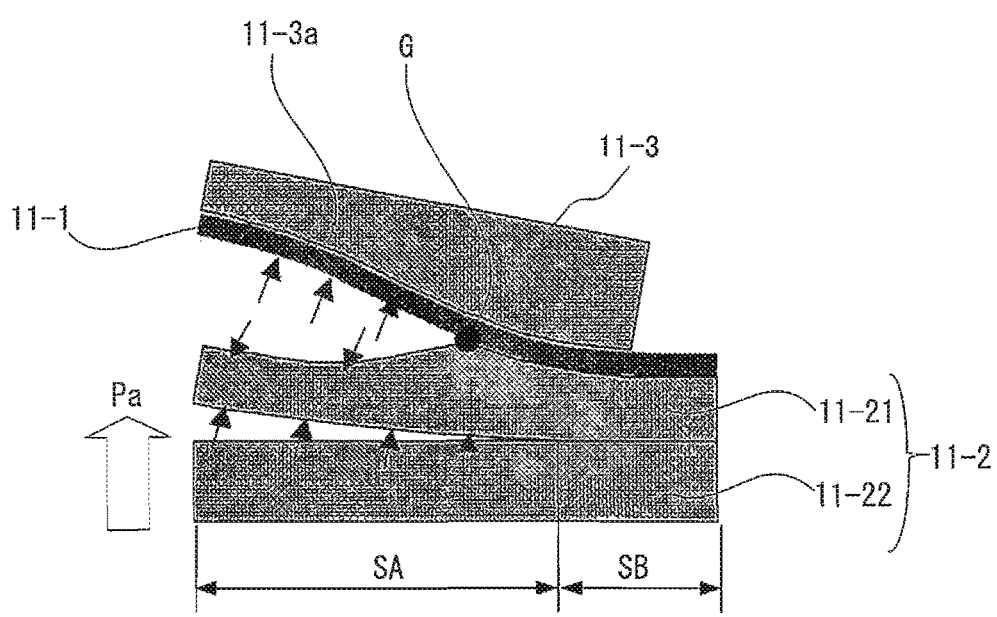
FIG. 4 is a diagram illustrating the state after a sensor diaphragm has come into contact with the bottom of a recess in the stopper member included in the pressure sensor chip according to Embodiment 1.

FIG. 4 illustrates the state after the sensor diaphragm 11-1 has come into contact with the bottom of the recess 11-3*a* in the stopper member 11-3. When an excessive pressure is applied to the one surface of the sensor diaphragm 11-1, the sensor diaphragm 11-1 is bent toward the stopper member 11-3, and comes into contact with the bottom of the recess 11-3*a* in the stopper member 11-3. When the excessive pressure increases after the sensor diaphragm 11-1 has come into contact with the bottom of the recess 11-3*a*, the stopper member 11-2 is deformed by the downward force applied to the stopper member 11-2, and tries to form an opening at the diaphragm edge.

In this case, in the pressure sensor chip 11A according to the present embodiment, the excessive pressure is also transmitted to the non-bonding region SA, which is provided in the stopper member 11-2, through the pressure introduction hole 11-2*b* uniformly along the passages 13 between the protrusions 12. Accordingly, the non-bonding region SA provides a pressure-receiving surface that receives the excessive pressure, and applies an upward force to the stopper member 11-21, so that deformation of the stopper member 11-21 is suppressed, or the stopper member 11-21 is deformed in the opposite direction. In the example illustrated in FIG. 4, the stopper member 11-21 is deformed in the upward direction so as to follow the upward deformation of the sensor diaphragm 11-1.

Accordingly, even when the excessive pressure increases after the sensor diaphragm 11-1 has come into contact with the bottom of the recess 11-3*a* in the stopper member 11-3, no opening is formed at the diaphragm edge, and stress concentration does not occur at the diaphragm edge. Therefore, an expected withstand pressure can be obtained.

In the present embodiment, the area of the non-bonding region SA provided in the stopper member 11-2, that is, the pressure-receiving area in the stopper member 11-2, is preferably sufficiently greater than the pressure-receiving area of the recess 11-2*a* in the stopper member 11-2 so that the deformation of the stopper member 11-2 in the downward direction can be suppressed or the stopper member 11-2 can be deformed in the opposite direction.

Figure 5:
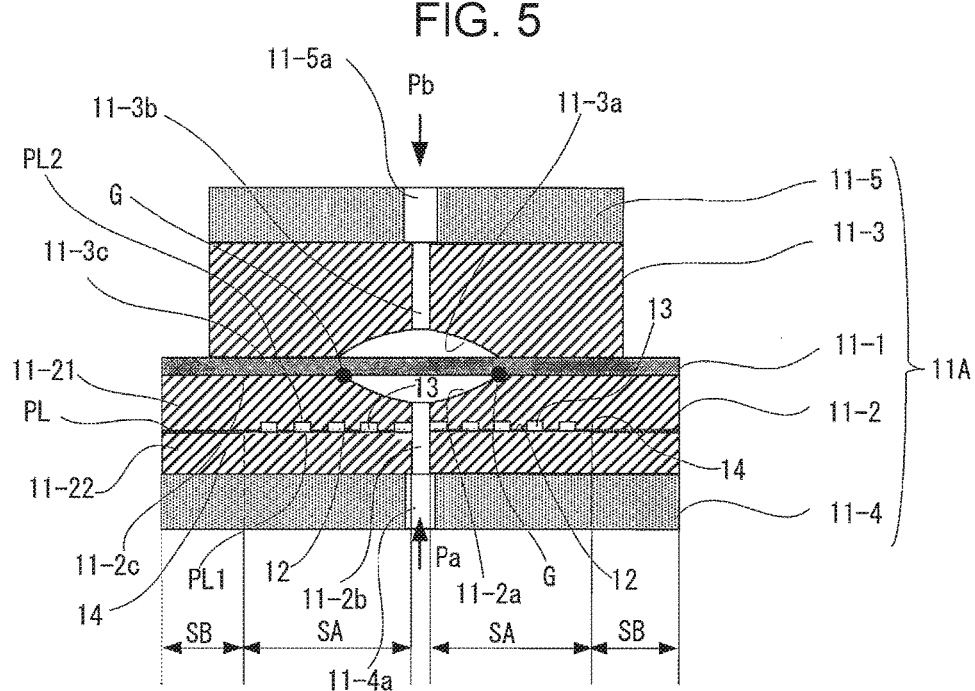
FIG. 5 is a diagram illustrating an example in which a plurality of protrusions are discretely formed on a second surface in the non-bonding region provided in the first holding member included in the pressure sensor chip according to Embodiment 1.
Figure 6:
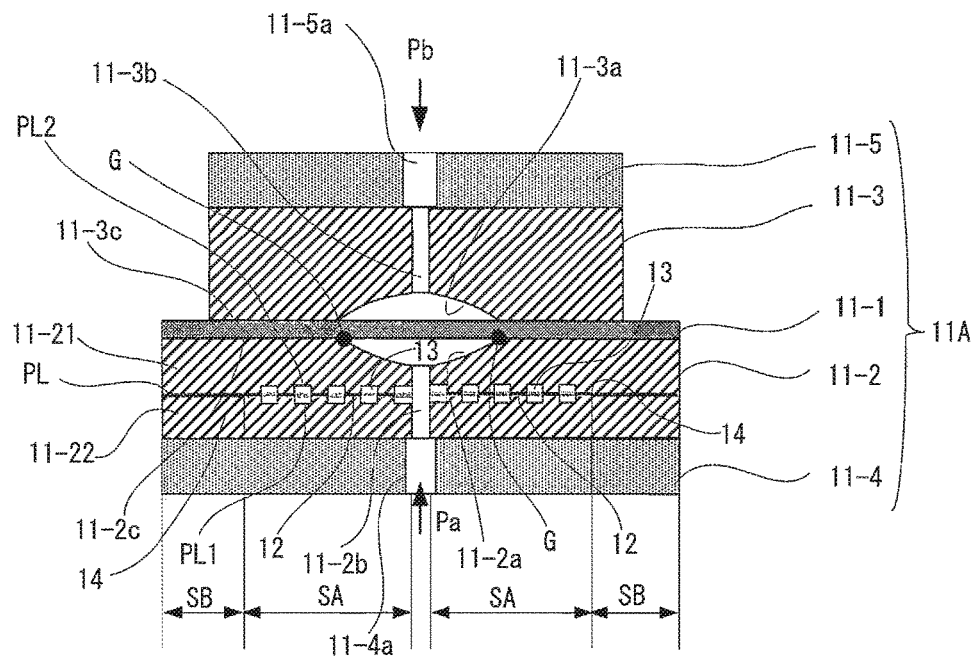
FIG. 6 is a diagram illustrating an example in which a plurality of protrusions are discretely formed on both the first surface and the second surface that oppose each other in the non-bonding region provided in the first holding member included in the pressure sensor chip according to Embodiment 1.

In the present embodiment, the protrusions 12 are discretely formed on the first surface PL1 in the non-bonding region SA provided in the stopper member 11-2. However, as illustrated in FIG. 5, for example, the protrusions 12 may instead be discretely formed on the second surface PL2. Alternatively, as illustrated in FIG. 6, the protrusions 12 may instead be formed on both the first surface PL1 and the second surface PL2.

[Embodiment 2]

FIG. 7 is a schematic diagram illustrating a pressure sensor chip according to a second embodiment of the present invention (Embodiment 2). A pressure sensor chip 11B according to Embodiment 2 includes an annular groove 11-2*d*, which is formed in the stopper member 11-2. The annular groove 11-2*d* is connected to the non-bonding region SA and is recessed in the thickness direction of the stopper member 11-3. Accordingly, the groove 11-2*d* is formed so as to project in the thickness direction of the stopper member 11-3. The annular groove 11-2*d* is a continuous groove that is not divided at discrete locations, and the cross section thereof preferably has a large diameter.

In the example illustrated in FIG. 7, the cross section of the annular groove 11-2*d* along a plane perpendicular to the non-bonding region SA is circular. However, the cross-sectional shape is not limited to circular, and may instead be, for example, a slit shape (rectangular) as illustrated in FIG. 8.

Figure 9:
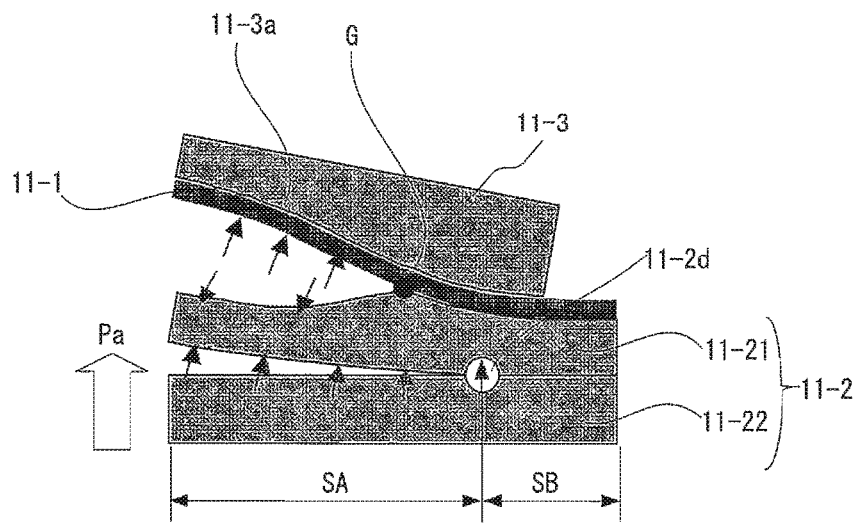
FIG. 9 is a diagram illustrating the state after a sensor diaphragm has come into contact with the bottom of a recess in the stopper member included in the pressure sensor chip according to Embodiment 2.

FIG. 9 illustrates the state after the sensor diaphragm 11-1 has come into contact with the bottom of the recess 11-3*a* in the stopper member 11-3 included in the pressure sensor chip 11B. When the annular groove 11-2*d* is formed, the stress is distributed in the annular groove 11-2*d*. Therefore, the withstand pressure can be further increased.

[Embodiment 3]

Figure 10:
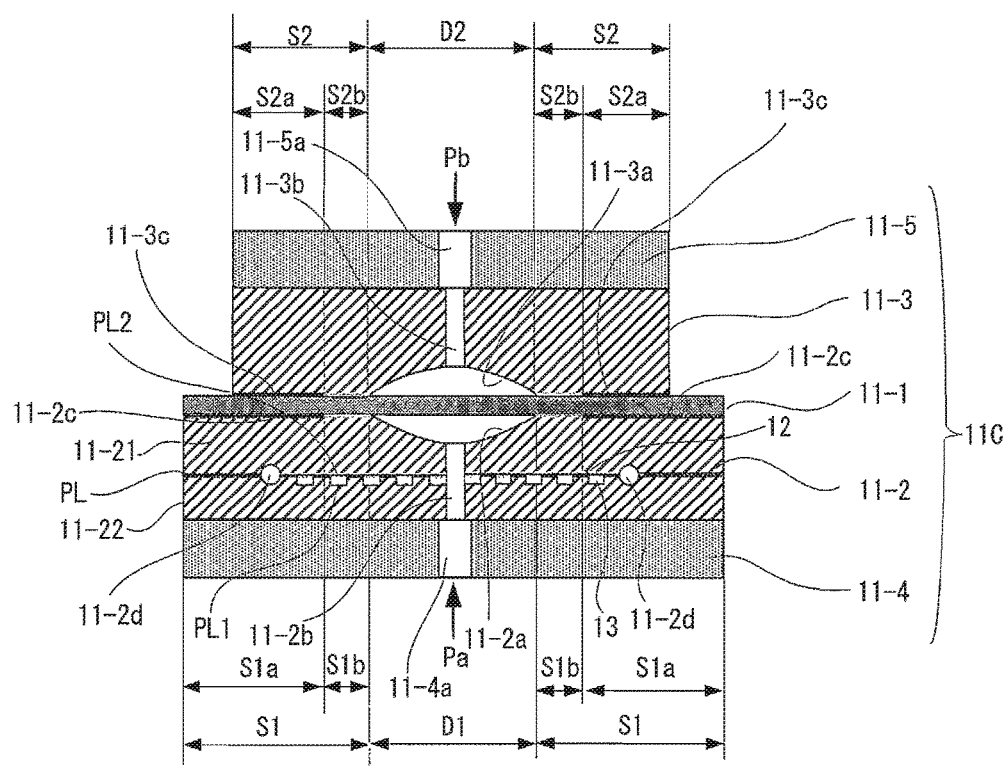
FIG. 10 is a schematic diagram illustrating a pressure sensor chip according to a third embodiment of the present invention (Embodiment 3).

FIG. 10 is a schematic diagram illustrating a pressure sensor chip according to a third embodiment of the present invention (Embodiment 3). Similar to the pressure sensor chip 11B according to Embodiment 2, a pressure sensor chip 11C according to Embodiment 3 includes the non-bonding region SA and the annular groove 11-2*d*, which is connected to the non-bonding region SA, in the stopper member 11-2. However, the pressure sensor chip 11C according to Embodiment 3 differs from the pressure sensor chip 11B according to Embodiment 2 in the following points.

In the pressure sensor chip 11C, a region S1 in which a peripheral portion 11-2c of the stopper member 11-2 faces one surface of the sensor diaphragm 11-1 includes an outer peripheral region S1a and an inner peripheral region S1b. The outer peripheral region S1a serves as a bonding region in which the peripheral portion 11-2c of the stopper member 11-2 is bonded to the one surface of the sensor diaphragm 11-1, and the inner peripheral region S1b serves as a non-bonding region in which the peripheral portion 11-2c of the stopper member 11-2 is not bonded to the one surface of the sensor diaphragm 11-1.

A region S2 in which a peripheral portion 11-3c of the stopper member 11-3 faces the other surface of the sensor diaphragm 11-1 includes an outer peripheral region S2a and an inner peripheral region S2b. The outer peripheral region S2a serves as a bonding region in which the peripheral portion 11-3c of the stopper member 11-3 is bonded to the other surface of the sensor diaphragm 11-1, and the inner peripheral region S2b serves as a non-bonding region in which the peripheral portion 11-3c of the stopper member 11-3 is not bonded to the other surface of the sensor diaphragm 11-1.

The peripheral portion 11-2c of the stopper member 11-2 is directly bonded to the one surface of the sensor diaphragm 11-1 in the outer peripheral region S1a so that the outer peripheral region S1a serves as the bonding region, and the peripheral portion 11-3c of the stopper member 11-3 is directly bonded to the other surface of the sensor diaphragm 11-1 in the outer peripheral region S2a so that the outer peripheral region S2a serves as the bonding region.

The surface of the peripheral portion 11-2c of the stopper member 11-2 is roughened by using plasma or chemical solution in the inner peripheral region S1b so that the inner peripheral region S1b serves as the non-bonding region in which the peripheral portion 11-2c of the stopper member 11-2 is in contact with but not bonded to the one surface of the sensor diaphragm 11-1. The surface of the peripheral portion 11-3c of the stopper member 11-3 is also roughened by using plasma or chemical solution in the inner peripheral region S2b so that the inner peripheral region S2b serves as the non-bonding region in which the peripheral portion 11-3c of the stopper member 11-3 is in contact with but not bonded to the other surface of the sensor diaphragm 11-1.

In the pressure sensor chip 11C, a region of the bottom surface of the sensor diaphragm 11-1 that is inside the non-bonding region S1b serves as a pressure-sensitive region D1 of the diaphragm, and a region of the top surface of the sensor diaphragm 11-1 that is inside the non-bonding region S2b serves as a pressure-sensitive region D2 of the diaphragm. In the pressure-sensitive region D1 of the diaphragm, one measurement pressure Pa is applied to the surface that faces the stopper member 11-2. In the pressure-sensitive region D2 of the diaphragm, the other measurement pressure Pb is applied to the surface that faces the stopper member 11-3. The diameter of the pressure-sensitive regions D1 and D2 is the effective diameter of the diaphragm.

Assume that, in the pressure sensor chip 11C, the measurement pressure Pa is the high-pressure-side measurement pressure and the measurement pressure Pb is the low-pressure-side measurement pressure. In this case, when the high-pressure-side measurement pressure Pa is applied to the bottom surface of the sensor diaphragm 11-1 in the pressure-sensitive region D1, the sensor diaphragm 11-1 can be bent without receiving an excessive tensile stress due to the restraint by the stopper member 11-2 in the non-bonding region S1b, in which the sensor diaphragm 11-1 is not bonded to the peripheral portion 11-2c of the stopper member 11-2. Accordingly, the stress generated in this portion can be reduced.

Alternatively, assume that, in the pressure sensor chip 11C, the measurement pressure Pb is the high-pressure-side measurement pressure and the measurement pressure Pa is the low-pressure-side measurement pressure. In this case, when the high-pressure-side measurement pressure Pb is applied to the top surface of the sensor diaphragm 11-1 in the pressure-sensitive region D2, the sensor diaphragm 11-1 can be bent without receiving an excessive tensile stress due to the restraint by the stopper member 11-3 in the non-bonding region S2b, in which the sensor diaphragm 11-1 is not bonded to the peripheral portion 11-3c of the stopper member 11-3. Accordingly, the stress generated in this portion can be reduced.

[Embodiment 4]

Figure 11:
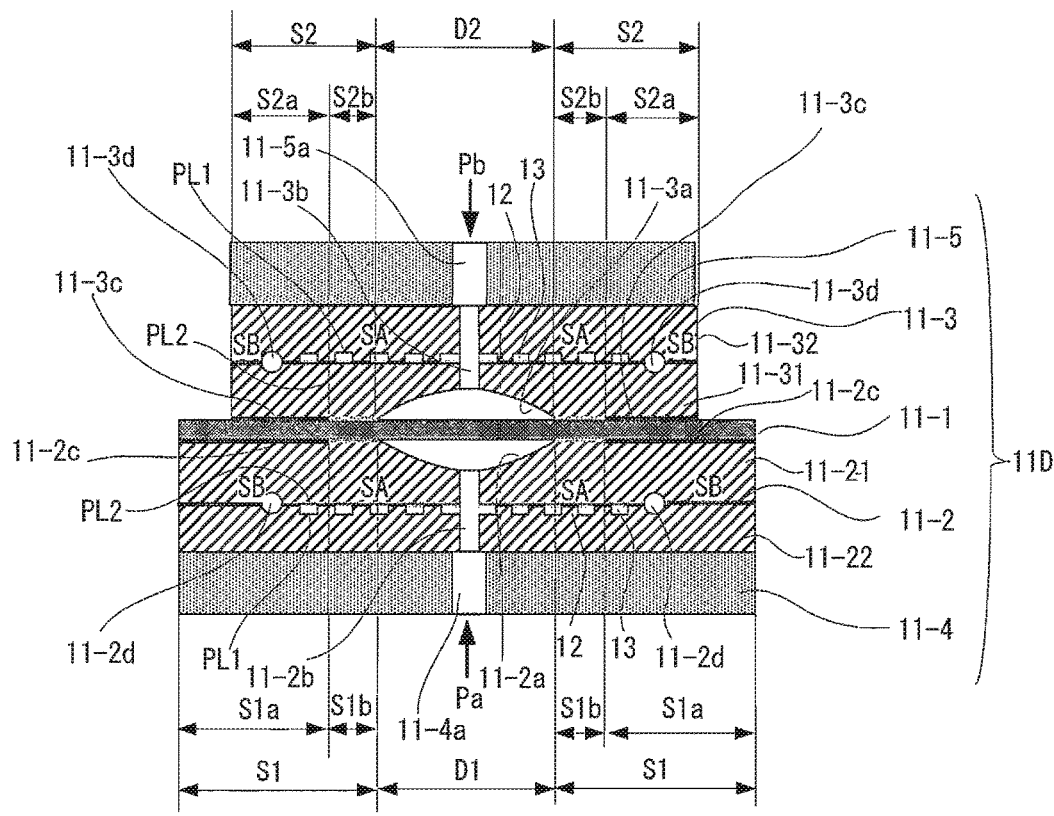
FIG. 11 is a schematic diagram illustrating a pressure sensor chip according to a fourth embodiment of the present invention (Embodiment 4).
Figure 12:
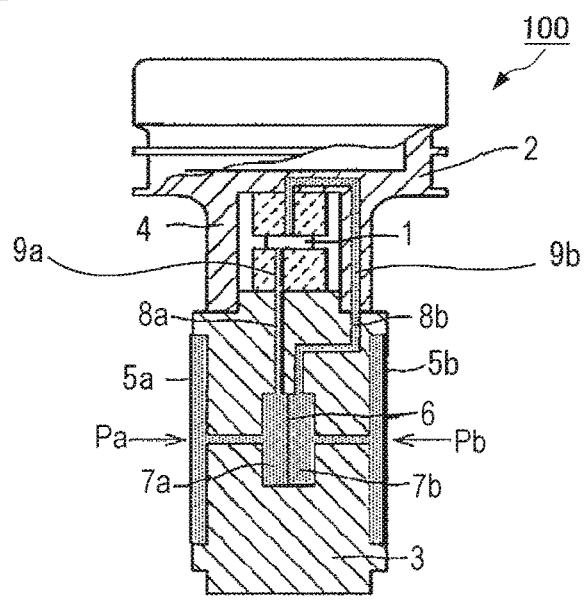
FIG. 12 is a schematic diagram illustrating the structure of a differential pressure sensor according to the related art.
Figure 13A:
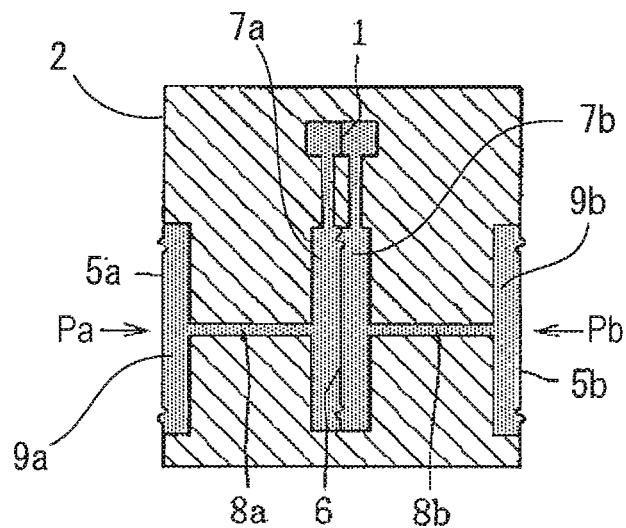
FIG. 13A is a schematic diagram illustrating an operation mode of the differential pressure sensor according to the related art.
Figure 13B:
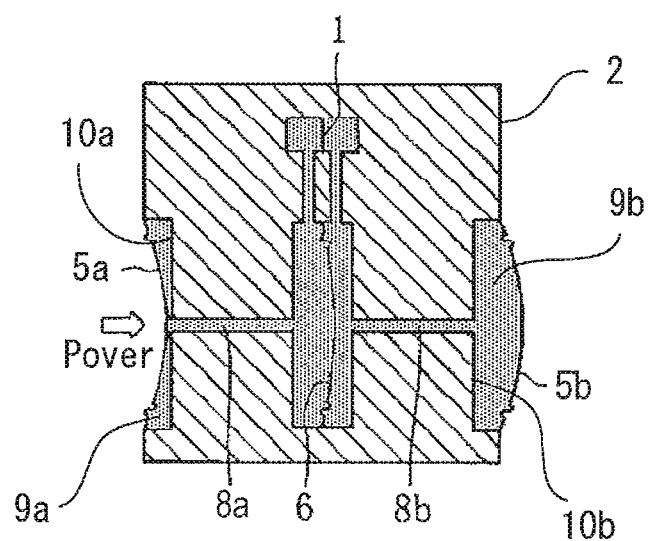
FIG. 13B is a schematic diagram illustrating an operation mode of the differential pressure sensor according to the related art.
Figure 14:
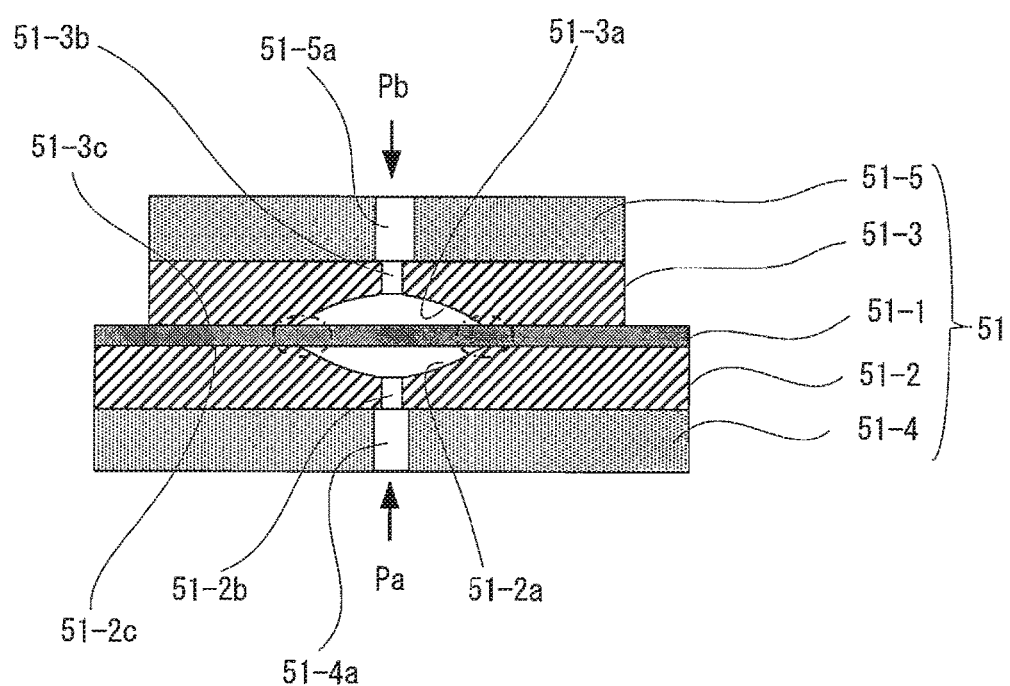
FIG. 14 is a schematic diagram illustrating a sensor chip having a structure described in PTL 1.

FIG. 11 is a schematic diagram illustrating a pressure sensor chip according to a fourth embodiment of the present invention (Embodiment 4).

In the example illustrated in FIG. 10, the non-bonding region SA is provided only in the stopper member 11-2. However, as in a pressure sensor chip 11D according to Embodiment 4 illustrated in FIG. 11, the non-bonding region SA may also be provided in the stopper member 11-3, and an annular groove 11-3d that is connected to the non-bonding region SA may also be formed.

In this case, a plurality of protrusions (columns) 12 are also discretely formed on at least one of first and second surfaces PL1 and PL2 that face each other in the non-bonding region SA provided in the stopper member 11-3 (first surface PL1 in this example). Passages (grooves) 13 between the protrusions 12 serve as channels between the periphery of the pressure introduction hole 11-3b and the peripheral edge 14 of the non-bonding region SA.

In the pressure sensor chip 11D according to Embodiment 4, the annular groove 11-2d formed in the stopper member 11-2 and the annular groove 11-3d formed in the stopper member 11-3 have the same cross-sectional shape and are disposed at the same location so as to face each other. However, the annular grooves 11-2d and 11-3d may have different cross-sectional shapes. In addition, the annular grooves 11-2d and 11-3d may be disposed at different locations in the lateral direction. The cross-sectional shapes of the annular grooves 11-2d and 11-3d are not limited to circular or a slit-shape as described above, and may be various shapes, such as elliptical.

In the above-described Embodiments 1 to 4, the recesses 11-2a and 11-3a are respectively formed in the stopper members 11-2 and 11-3. However, it is not necessary that the recesses 11-2a and 11-3a be provided. The stopper members 11-2 and 11-3 may instead be simple holding members that simply hold the sensor diaphragm 11-1. Also in this case, the non-bonding region provided in at least one of the holding members provides a pressure-receiving surface that applies a force in a direction opposite to the direction in which the sensor diaphragm 11-1 is bent.

Although the pressure sensor chips according to the above-described embodiments are of the type in which a strain resistance gauge having a resistance that varies in accordance with a pressure change is formed on the sensor diaphragm 11-1, the pressure sensor chips may instead be capacitance-type sensor chips. A capacitance-type sensor chip includes a substrate having a certain space (capacity chamber), a diaphragm disposed in the space in the substrate, a fixed electrode formed on the substrate, and a movable electrode formed on the diaphragm. When the diaphragm receives a pressure and is deformed, the gap between the movable electrode and the fixed electrode changes and the capacitance therebetween changes accordingly.

[Other Embodiments]

Although the present invention has been described by referring to embodiments, the present invention is not limited to the above-described embodiments. Various modifications that are understandable by a person skilled in the art can be made on the structure and details of the present invention within the technical idea of the present invention. In addition, the embodiments may be implemented in any combination unless they contradict each other.

INDUSTRIAL APPLICABILITY

The pressure sensor chip according to the present invention is applicable to various uses, and may be used as, for example, an industrial differential pressure sensor.

REFERENCE SIGNS LIST 11C to 11D pressure sensor chip, 11-1 sensor diaphragm, 11-2 (11-21, 11-22), 11-3 (11-31, 11-32), 11-2a, 11-3a recess, 11-2b, 11-3b pressure introducing hole (pressure introduction hole), 11-2c, 11-3c peripheral portion, 11-2d, 11-3d annular groove, 11-4, 11-5 base, 11-4a, 11-5a pressure introducing hole (pressure introduction hole), SA non-bonding region, SB bonding region, S1a, S2a outer peripheral region (bonding region), S1b, S2b inner peripheral region (non-bonding region), D1, D2 pressure-sensitive region, PL1 first surface, PL2 second surface, 12 protrusion (column), 13 passage (groove), 14 peripheral edge.

The invention claimed is:

1. A pressure sensor chip, comprising:
a sensor diaphragm that outputs a signal corresponding to a difference between pressures applied to one surface and an other surface of the sensor diaphragm; and
a first holding member and a second holding member that are respectively bonded to the one surface and the other surface of the sensor diaphragm in such a manner that peripheral portions of the first and second holding members face the one surface and the other surface of the sensor diaphragm, each of the first and second holding members including a pressure introduction hole that transmits a measurement pressure to the sensor diaphragm,
wherein the first holding member includes
a non-bonding region formed inside the first holding member, the non-bonding region being parallel to pressure-receiving surfaces of the sensor diaphragm and being connected to a periphery of the pressure introduction hole, and
a plurality of protrusions that are discretely formed on at least one of a first surface and a second surface that face each other in the non-bonding region inside the first holding member,
wherein passages between the plurality of protrusions formed in the first holding member form channels, the channels being formed at the periphery of the pressure introduction hole and extending to a peripheral edge of the non-bonding region, and at least one of the passages connects to the pressure introduction hole, and wherein the second holding member includes
a recess formed in a surface of the second holding member at a side at which the second holding member is bonded to the other surface of the sensor diaphragm.

2. The pressure sensor chip according to claim 1, wherein the first holding member further includes an annular groove formed in the first holding member at a peripheral portion of the non-bonding region so as to be recessed in a thickness direction of the first holding member.

3. The pressure sensor chip according to claim 2, wherein a cross section of the annular groove along a plane perpendicular to a direction in which the annular groove extends has an arc shape.

4. The pressure sensor chip according to claim 1, wherein the first holding member is divided into two portions by a plane that is parallel to the pressure-receiving surfaces of the sensor diaphragm and along which the non-bonding region is provided, and
wherein the two portions of the first holding member are bonded to each other in a region other than the first surface and the second surface that defines the non-bonding region.

5. The pressure sensor chip according to claim 1, wherein the one surface of the sensor diaphragm is a pressure-receiving surface that receives a high-pressure-side measurement pressure, and
wherein the other surface of the sensor diaphragm is a pressure-receiving surface that receives a low-pressure-side measurement pressure.

6. The pressure sensor chip according to claim 1, wherein the first holding member includes
a recess formed in a surface of the first holding member at a side at which the first holding member is bonded to the one surface of the sensor diaphragm,
wherein the second holding member includes
a non-bonding region formed inside the second holding member, the non-bonding region being parallel to the pressure-receiving surfaces of the sensor diaphragm and being connected to a periphery of the pressure introduction hole, and
a plurality of protrusions that are discretely formed on at least one of a first surface and a second surface that face each other in the non-bonding region in the second holding member, and
wherein passages between the plurality of protrusions formed in the second holding member form channels between the periphery of the pressure introduction hole and a peripheral edge of the non-bonding region.

7. The pressure sensor chip of claim 1, wherein each of the plurality of protrusions is a circular column extending from the first surface to the second surface inside the first holding member.

8. The pressure sensor chip of claim 1, wherein each of the plurality of protrusions is a hexagonal column.

9. A pressure sensor chip, comprising:
a sensor diaphragm that outputs a signal corresponding to a difference between pressures applied to one surface and an other surface of the sensor diaphragm; and
a first holding member and a second holding member that are respectively bonded to the one surface and the other surface of the sensor diaphragm in such a manner that peripheral portions of the first and second holding members face the one surface and the other surface of the sensor diaphragm, each of the first and second holding members including a pressure introduction hole that transmits a measurement pressure to the sensor diaphragm, wherein the first holding member includes
- a non-bonding region formed inside the first holding member, the non-bonding region being parallel to pressure-receiving surfaces of the sensor diaphragm and being connected to a periphery of the pressure introduction hole, and
- a plurality of protrusions that are discretely formed on at least one of a first surface and a second surface that face each other in the non-bonding region inside the first holding member, wherein passages between the plurality of protrusions formed in the first holding member form channels, the channels being formed at the periphery of the pressure introduction hole and extending to a peripheral edge of the non-bonding region, wherein the second holding member includes a recess formed in a surface of the second holding member at a side at which the second holding member is bonded to the other surface of the sensor diaphragm, and wherein the first holding member is configured to divide into two portions that are separated along the non-binding region, when the difference between the pressures exceeds a threshold.

10. A pressure sensor chip, comprising:

a sensor diaphragm that outputs a signal corresponding to a difference between pressures applied to one surface and an other surface of the sensor diaphragm; and a first holding member and a second holding member that are respectively bonded to the one surface and the other surface of the sensor diaphragm in such a manner that peripheral portions of the first and second holding members face the one surface and the other surface of the sensor diaphragm, each of the first and second holding members including a pressure introduction hole that transmits a measurement pressure to the sensor diaphragm, wherein the first holding member includes
- a non-bonding region formed inside the first holding member, the non-bonding region being parallel to pressure-receiving surfaces of the sensor diaphragm and being connected to a periphery of the pressure introduction hole, and
- a plurality of protrusions that are discretely formed on at least one of a first surface and a second surface that face each other in the non-bonding region inside the first holding member, wherein passages between the plurality of protrusions foiled in the first holding member form channels, the channels being formed at the periphery of the pressure introduction hole and extending to a peripheral edge of the non-bonding region, wherein the second holding member includes a recess formed in a surface of the second holding member at a side at which the second holding member is bonded to the other surface of the sensor diaphragm, and wherein each of the plurality of protrusions is a circular column.

* * * * *